June 23, 1925. 1,543,116
J. MADER
POWER LIFT AGRICULTURAL IMPLEMENT
Filed Sept. 14, 1922 3 Sheets-Sheet 2
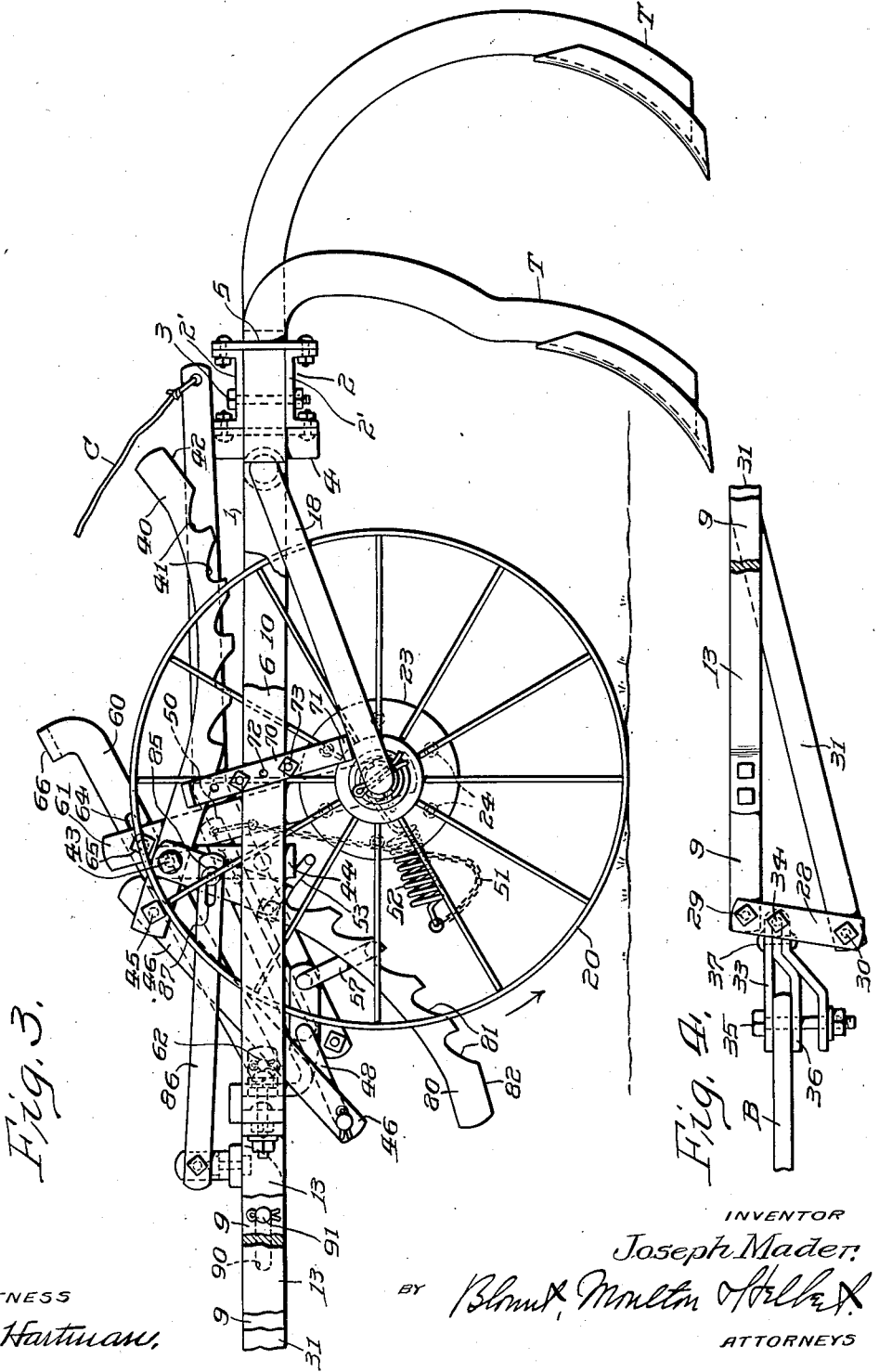
INVENTOR
Joseph Mader,
BY
ATTORNEYS
WITNESS

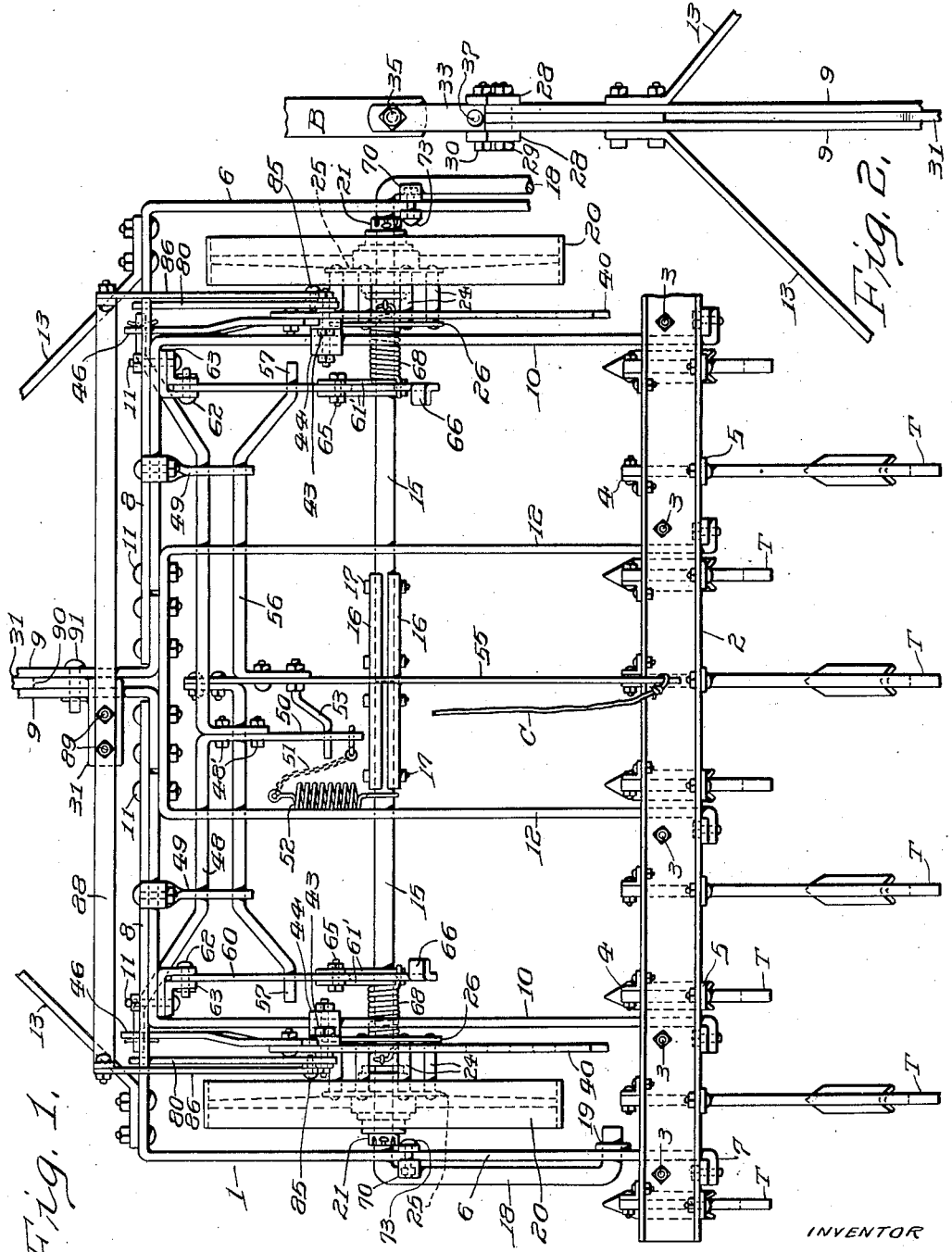

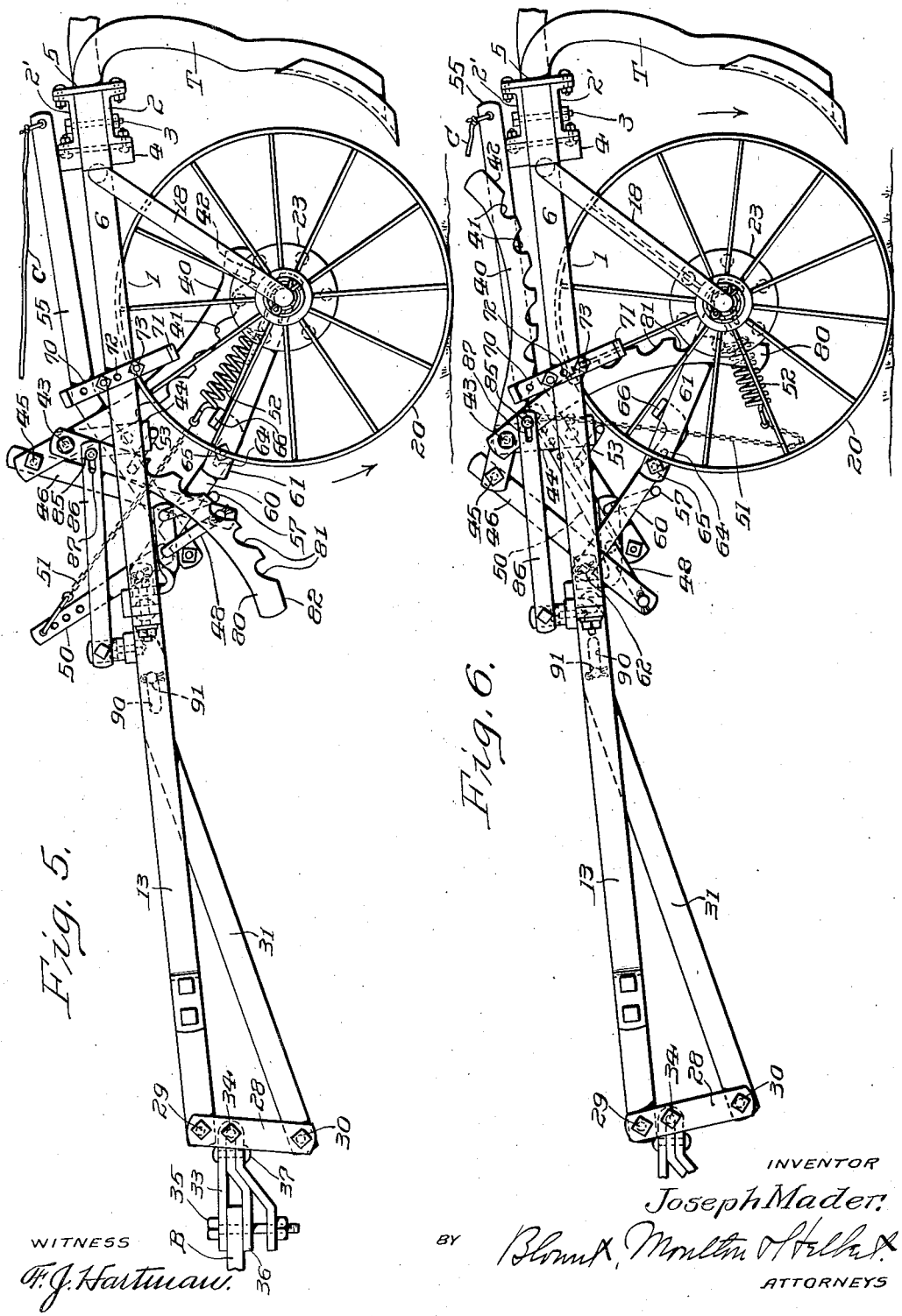

Patented June 23, 1925.

1,543,116

UNITED STATES PATENT OFFICE.

JOSEPH MADER, OF PHILADELPHIA, PENNSYLVANIA, ASSIGNOR TO S. L. ALLEN & CO., INC., A CORPORATION OF PENNSYLVANIA.

POWER-LIFT AGRICULTURAL IMPLEMENT.

Application filed September 14, 1922. Serial No. 588,119.

*To all whom it may concern:*

Be it known that I, JOSEPH MADER, a citizen of the United States, and a resident of the city and county of Philadelphia, State of Pennsylvania, have invented certain new and useful Improvements in Power-Lift Agricultural Implements, of which the following is a specification, reference being had to the accompanying drawings.

My invention relates more particularly to that class of implements intended to be drawn by a tractor or other suitable source of motive power, a principal object of the invention being to provide an implement of this general character embodying means whereby that part of the implement to which the ground working tools are attached may be lifted through power supplied from the movement of the implement to withdraw the tools from the ground.

A further object of my invention is to provide means in an implement of the character aforesaid and in a preferred embodiment thereof, whereby the lifting of the tool carrying frame may be effected either when the implement is moving forwardly or when it is moving rearwardly over the ground, the instrumentalities for effecting these functions being preferably so arranged that during the forward motion of the implement the raising of the tool carrying frame may be effected through manually controlled means while during the rearward motion of the implement the raising of the tool carrying frame may be effected automatically, so that upon the initiation of a rearward movement or "backing up" of the implement, the tools will be immediately raised from working position clear of the ground without any attention from the operator, and thereafter maintained in that position until the releasing means are manually operated to permit the tools to again return to working position.

A still further object of the invention is to provide means, in a power lift agricultural implement comprising a vertically removable tool carrying frame operatively supported on laterally disposed ground wheels, for raising the frame from working position, said means being so arranged as to be normally actuated from both of said wheels yet capable of independent actuation from either wheel so that if under working conditions one wheel is incapable, by reason of insufficient traction or the like, of supplying its ordinary quota of power to the frame lifting means, the latter will nevertheless be actuated by the other wheel and the desired elevation of the frame be thus effected. Hitherto in implements of this general character, it has been customary to actuate the frame lifting means from a single wheel, a procedure which is extremely disadvantageous in that if the said wheel is incapable, through insufficient traction or other causes, of imparting to the frame lifting means sufficient power to enable them to properly perform their function, the frame cannot be raised until normal traction is again established by the wheel. On the other hand, since in my invention the various instrumentalities are so arranged that the power for raising the frame can be supplied by either wheel independently of the other, the lifting of the frame may be accomplished when either wheel is in condition to supply the requisite power and irrespective of whether the other wheel is in a similar condition, a point of great practical importance in agricultural operations in certain kinds of soils or where the terrain is of irregular contour.

The invention further comprehends the general improvements and simplification of power lift agricultural implements and the design and arrangement of the several means and instrumentalities employed to effect the several functions of the machine so as to enable the same to be made of sturdy construction, and of a character not liable to get out of order under the conditions of use encountered in the operation of machines of this general character.

My invention further includes all of the other objects and novel features of design, construction and arrangement of the various elements and instrumentalities hereinafter more specifically described or illustrated in the accompanying drawings.

While for the purpose of carrying out the various functions and objects of my invention I may make use of any suitable means or combination of elements effective for accomplishing the results desired, I have, in the accompanying drawings, illustrated a preferred embodiment of means adapted therefor and embodied in an implement intended for the cultivation of the ground, but it will be understood that I do not intend to thereby limit myself to the precise means shown or to the use of the invention in any particular style or type of implement adapted for any particular agricultural operation, as my invention may be readily embodied in or utilized in connection with implements other than cultivators if desired.

In the said drawings, Fig. 1 is a fragmentary top plan view of a power lift cultivator constructed in accordance with a preferred embodiment of the invention, the ground working tools being in lowered or working position; Fig. 2 is a fragmentary top plan view of the forward end of the draft mechanism showing the same in operative connection with a portion of the draw bar of a tractor; Fig. 3 is an enlarged fragmentary side elevation of the machine with the ground working tools in operative position; Fig. 4 is a fragmentary detail view of the mechanism shown in Fig. 2; Fig. 5 is a fragmentary side elevation of the machine on a somewhat smaller scale than Fig. 3 showing the tool carrying frame in raised position with the ground working tools clear of the ground and illustrating the position of the parts when the frame has been raised during a forward movement of the implement and the frame elevating means have substantially completed the operation of raising the frame, while Fig. 6 is a view similar to Fig. 5 but showing the position of the parts when the frame has been raised during a rearward movement of the implement. Like numerals are used to designate the same parts in the several figures.

The embodiment of the invention illustrated comprises a rectangular, generally horizontally disposed main frame designated as 1 and comprising a relatively heavy transversely extending tool bar 2, which is preferably formed of upper and lower members 2', 2' of channel section, vertically spaced apart to afford room for the passage of the substantially horizontally disposed shanks of the laterally spaced ground working tools T which may be of any suitable form, the members being clamped against the shanks by vertically extending bolts 3. Preferably also the forward ends of the shanks are bolted to plates or clips 4 secured to the forward faces of the members, while flat apertured plates 5 secured to the rear faces of the members and through which the shanks extend serve to assist in securely maintaining the tools in position. The specific form of the tool bar 2, however, and the manner of attaching the shanks of the tools thereto may, if desired, be readily changed from the form illustrated.

The tool bar forms the rear member of the frame 1 and from points adjacent the ends of the bar are forwardly extended the side frame members 6, 6. The rear ends of these members are rigidly bolted to the tool bar as at 7 and their forward ends respectively directed inwardly to form the front frame members 8, 8, the inner ends of these parts being terminated in spaced relation with each other to provide room for the passage of the members 9, 9 of the draft means, hereinafter more particularly described. To enhance the rigidity of the frame, stiffening bars 10 are arranged at spaced intervals between the end members 6, 6, and are securely bolted at their rear ends to the tool bar and turned inwardly at their forward ends into parallel relation with and securely bolted to the front frame members 8, 8, by suitably disposed bolts generally designated as 11, while an additional stiffening member 12 of generally U-shaped form is disposed at the center of the machine and similarly secured in place. Braces 13 may also be extended diagonally from the front frame members to some convenient point toward the forward ends of the draft members 9, to securely brace the latter.

It will be noted that the several parts of the frame hitherto described are symmetrical with respect to the center line of the machine; that the side members 6 are exactly similar to each other; that the stiffening bars 10 are also similar and that the stiffening member 11 is also symmetrically disposed with respect to the center line. This is a matter of distinct practical advantage both from a manufacturing standpoint and also from the standpoint of the user, as in assembling the machine substantially any given part may be used on either the right or left hand side thereof without change of form, while, on the other hand, in case of damage to any given part when the machine is in the hands of the user, it is not necessary in ordering a duplicate to specify for which side of the machine it is required. In fact, throughout the design and construction of the preferred embodiment of the machine, the same thought has been consistently followed and the various parts, as will be apparent from the drawings, formed as far as possible in such manner that they may be used with equal facility for the performance of corresponding functions on either side of the center line of the machine, thereby materially lowering the cost of production and effecting other material advantages as will be readily apparent both from the viewpoint of the manufacturer and of the user.

The frame is operatively supported on an axle 15, the main part of which is horizontally disposed and for convenience split at its center, the two parts thus formed being rigidly united by a split sleeve 16 secured to the axle by bolts 17 extending through the axle and the sleeve, thus forming an operative unitary whole. The ends 18 of the axle are turned at right angles to its main portion and respectively journaled at their extremities as at 19 in the side members 6 of the frame at points adjacent the forward face of the tool bar. The main portion of the axle serves to support a pair of suitable ground wheels 20 respectively disposed adjacent the side members of the frame, each wheel being freely rotatable on the axle and maintained from longitudinal displacement thereon by collars 21 pinned thereto. On the inner face and projecting inwardly beyond the inner rim of each ground wheel is a lantern wheel, generally designated as 23, and comprising a plurality of spaced horizontally disposed spindles 24 secured at their outer ends in a disk or plate 25 fastened to the spokes of the wheel and at their inner ends to a similar plate 26, the function and purpose of these lantern wheels being hereafter more fully described.

A pair of forwardly projecting preferably slightly laterally spaced draft members 9, hitherto referred to, are provided, the inner ends of which are turned outwardly and bolted between the transverse portions of the stiffening member 12 and the inner ends of the front frame members 8, as best shown in Fig. 1. At the forward extremities of these members, which terminate at any suitable distance beyond the main portion of the frame, a pair of depending laterally spaced links 28 are disposed and pivotally supported on a horizontal pivot bolt 29 passing through the links and through the members, while between the opposite ends of the links and pivotally supported upon a horizontal pivot bolt 30 is disposed the forward end of a rearwardly and angularly upwardly extending slide 31 hereinafter more particularly described. For affording means for attachment of the draw bar B of the tractor or other source of motive power, a yoke 33 is supported between the links 28 upon a transversely extending bolt 34, this yoke being conveniently formed of a flat strip of steel of suitable length and width which is bent around the bolt substantially at the center of the strip and arranged with its free ends in forwardly projected and vertically spaced disposition, the said ends being provided with vertically extending apertures for the passage of a lynch pin 35. If desired and to afford additional strength, a stiffening member 36 may be arranged between the upper and lower parts of the yoke and secured thereto by a rivet 37, the rear end of this member terminating adjacent the bolt 34 so as to limit the amount of longitudinal play of the yoke with respect to the bolt while permitting free vertical movement of the yoke with respect thereto.

It will be observed that the bolt 34 is positioned more nearly adjacent the pivot bolt 29 than is the pivot bolt 30, so that relatively slight movement of the yoke either forward or backward is effective to swing the links about the bolt 29 and to move the bolt 30 through a considerably greater arc than that traversed by the bolt 34.

On each side of the machine, above and in alignment with each of the lantern wheels 23, is disposed a suitably curved lifting arm 40 which is provided on its lower edge with a series of notches 41 of suitable shape to cooperate with the studs of the lantern wheel, the last notch toward the rear end of the arm being disposed, however, at a short distance from the extremity thereof so as to leave a plain edge or surface 42 between the end of the notch and the end of the arm. Each arm is pivoted near its upper end on a horizontally disposed pivot bolt 43 carried by a suitable vertically extending bracket 44 bolted to the adjacent side frame member, while the extreme upper and forward end of each arm is pivoted by a bolt 45 to the upper end of a link 46, the other or lower end of which projects a short distance below the frame and is rotatably supported near the outer end of a transversely extending crank shaft 48. This shaft is conveniently formed in two parts from a piece of round stock secured together by bolts 48' and rotatably horizontally supported in brackets 49 secured to the front members of the frame, the shaft outside of the brackets being angularly, forwardly and generally downwardly offset so as to bring its extremities, on which the links 46 are mounted, in parallel relation with the main part of the shaft but so disposed with respect thereto that axial rotation of the main part will cause the ends to traverse a considerable arc, while suitably secured to or integral with the main part of the shaft is a normally rearwardly extending arm 50, the end of which is loosely connected, as by a chain 51, with one end of a coil spring 52, the other end of which is loosely turned about the axle 15. Preferably the arm 50 and the extremities of the crank shaft are disposed in substantially the same plane and the several parts just described so arranged and proportioned that when the arm is turned to extreme rearward position, as shown in Figs. 1 and 3, the forward or upper ends of the lifting arms are simultaneously depressed and the rear ends elevated as shown in Fig. 6, while when the arm 50 is brought to a position in which it projects more or less angularly forward the rear ends of the lifting arms are lowered to permit the notches 41 to engage the spindles of the subjacent lantern wheels.

Manually operable means are provided for moving the arm 50 from its normal, rearwardly extending position, said means conveniently comprising a trip 53 laterally extending from a control lever 55 which is operatively connected with a transversely extending toggle control shaft 56, also conveniently supported in the brackets 49. For convenience of construction this shaft may be made in two pieces symmetrical with respect to each other and having their inner ends bolted to the end of the control lever in the manner clearly shown in Fig. 1, the outer ends of the shaft being angularly offset as at 57 for a purpose to be hereinafter described. The upper or free end of the control lever is adapted for connection to a cord C which is carried forward to some point on the tractor convenient to the operator and by means of which he can pull the control lever upwardly and forwardly from its normally rearwardly extending horizontal position, as shown in Fig. 3, sufficiently to cause the trip 53 to swing the arm 50 angularly forward and upward, thus depressing and moving rearwardly the lower ends of the links from the position shown in Fig. 3 and in turn simultaneously lowering the lifting arms from the positions shown in that figure to one in which the uppermost of the notches 41 in each arm will coact one of the studs in the subjacent lantern wheel. If, under these circumstances, the implement be moving forward and the ground wheels rotating in the direction of the arrows in Figs. 3 and 5, the rotation of the wheels will, through the coaction of the lantern wheels and the lifting arms, raise the frame upwardly and forwardly, the axle 15 turning on its longitudinal axis and its normally rearwardly extending ends also moving upwardly and forwardly until the frame assumes a position substantially as shown in Fig. 5. It will be noted that in this position a spindle of the lantern wheel is in cooperation with the last notch in the lifting arm and that further revolution of the lantern wheel will bring the next spindle into cooperation with the face 42 and raise the arm to a position in which it can no longer cooperate with the wheel, and thus remove the support theretofore afforded the frame, which would thereby permit the latter, in the absence of the means now to be described, to drop back to normal or substantially horizontal position as shown in Fig. 3.

Means are, however, provided for automatically maintaining the frame in fully elevated or raised position once it has been brought to the same, said means preferably comprising a pair of toggle members 60 and 61 arranged on each side of the machine, the member 60 having its forward end pivoted on a bolt 62 carried in a bracket 63 secured to the forward members of the frame and toward its rearward end being provided with a closed slot 64 through which is extended a bolt 65 which also passes through one end of the laterally spaced plates 61' which together form the member 61 and the other ends of which are loosely supported on the axle. The extreme rear end of the member 60 is turned upwardly and outwardly so as to form a dog 66 adapted to engage the upper edges of one or both of the plates 61' when the members of the toggle have passed slightly beyond center as shown in Figs. 5 and 6 and thus lock the members together against further relative movement in a downward direction. In order to at all times urge the members of the toggle downwardly, a relatively heavy spring 68 is coiled about the axle adjacent each of the members 61 and one of its ends carried thereover while the other is anchored to the axle, the spring being wound in such direction as to constantly tend to depress the member and thus insure the parts passing over the center and effecting a toggle action whenever they are permitted to do so by a sufficient upward and forward movement of the frame with respect to the axle.

It will thus be observed that when the frame is in normal or substantially horizontal position as shown in Fig. 3, the members of each toggle point in a generally upward direction and are in distinct angular relation with respect to each other; that as the frame is gradually lifted and moved forward with respect to the axle through the coaction of the lifting arms and the lantern wheels, the members of the toggles progressively approach aligned relation, and then pass over center and assume a slightly angular or toggled relation in the other direction prior or substantially simultaneously to the time when the lifting action exerted by the lantern wheels and lifting arms ceases, so that the frame is thereafter supported in raised position solely through the operation of the toggles. The slot 64 in each toggle is obviously requisite to permit the members of the latter to cross the center during the upward movement of the frame and to permit, when desired, the breaking of the toggles in the opposite direction as hereinafter described.

It will be further observed that as the lifting arms progressively approach a more or less upright position during the raising of the frame, the crank shaft 48 is gradually pulled toward the rear with a corresponding forward movement of the arm 50 until the latter assumes substantially the position shown in Fig. 5, resulting in placing the spring 52 under a considerable tension. In consequence, when the downward thrust on the lifting arms is relieved and the toggles become effective to support the frame in elevated position, the spring functions to forcibly pull the arm 50 rearwardly and thus positively return the lifting arms to their normal position as shown in Figs. 3 and 6 and in which they remain until again brought into cooperation with the lantern wheels through actuation of the control lever 55.

When it is desired to lower the frame from the elevated position in which it is supported by the toggles, recourse is again had to the control lever 55 and the same pulled forward, thereby rotating the toggle control shaft 56 sufficiently to first bring the ends thereof into contact with the toggles and then to cause the toggle members to move upwardly over the center or "break", when the frame, being no longer supported, falls by gravity to normal position.

For the purpose of determining the normal position of the frame, suitable means are provided conveniently comprising adjustable stops 70 secured to the side frame members in such position that their lower extremities will contact with the upper surface of the ends 18 of the axle and limit the distance through which the frame can move downwardly from raised position. As shown, each of these stops comprises a flat bar of suitable size, the lower end of which is outwardly turned to provide a foot 71 for contact with the axle, each bar being provided with a plurality of spaced holes 72 for the passage of bolts 73 by which it is secured to the frame. By utilizing different holes the relative position of the stops and the frame may be changed so as to maintain the frame at a greater or less height with respect to the ends of the axle with corresponding regulation of the depth to which the tools T can enter the ground, thereby providing a convenient means for adjusting the depth to which the cultivation of the soil will be effected by the machine.

It will be apparent from the foregoing description that the lifting arms 40 are only effective to lift the frame of the machine when the latter is being pulled forwardly over the ground and the ground wheels are rotating in the direction indicated by the arrows in Figs. 3 and 5, and further, that a manual actuation of the control lever 55 is required to cause the arms to descend to a position in which they can cooperate with the lantern wheels and initiate the upward movement of the frame. In the practical operation of machines of this general character, however, it often becomes necessary to "back" the implement for a greater or less distance, and if, under these conditions, the tools T are in lowered or operative position, they, as well as the whole machine, are subjected to excessive strain, the ground is torn and plowed up and the tools frequently become clogged with débris of various sorts. I therefore, in the preferred embodiment of the invention, provide means operative to commence the lifting of the frame and consequent withdrawal of the tools from the ground immediately upon any backward movement of the implement and to complete the elevation thereof to a point at which the toggles, hitherto described, become operative to hold the frame in raised position if the backward movement of the implement be sufficiently continued, said means being automatically brought into operation by the backward movement of the tractor or other source of motive power either just prior to or substantially simultaneously with the initiation of the backward movement of the implement. Thus, by reason of the automatic actuation of the said mechanism, the operator is relieved from the necessity of seeing that the frame has been raised prior to reversing the tractor while possible injury to or clogging of the implement which might result from neglect of this precaution is positively and automatically prevented.

More particularly, for accomplishing the aforesaid functions I provide, in the preferred embodiment of the invention, a pair of lifting arms 80 of form generally similar to those hitherto described and pivot each of them at its upper end on the pivot bolts 43 in such manner that the arms will respectively occupy positions in front of the axle and in the planes of the lantern wheels. Each arm is arranged to curve generally downwardly and forwardly from its upper extremity, its rear face being provided with notches 81 adapted for cooperation with the spindles of the adjacent lantern wheel and with a face 82 adjacent its lower extremity substantially corresponding with the faces 42 on the lifting arms 40. Each of the arms 80 adjacent its upper extremity and below the bolt 43 is pivotally connected by a bolt 85 with a forwardly extending link 86, the latter being provided with a short slot 87 through which the bolt extends, while the forward ends of these links are in turn bolted to a transversely extending cross bar 88 arranged in front of and parallel to the front members of the frame, this bar, in turn, being rigidly secured by bolts 89 to the inner or rear end of the slide 31. This slide is preferably formed from a flat bar of steel of suitable thickness to slidably enter between the draft members 9, 9, the extreme rear end of the slide being turned over horizontally above the upper edges thereof to afford a convenient means of attaching the cross bar to the slide as clearly shown in Fig. 1. From the cross bar the slide is extended forwardly between the draft members and parallel thereto for a suitable distance, is then directed angularly downward and forward to the pivot bolt 30 already described and is provided, in the portion lying between the draft members, with a horizontal slot 90 through which extends a horizontally disposed pin 91, also extending through and fixed with respect to the draft members so that the slide is capable of a short sliding movement with respect to the draft members and the pin, the extent of which is limited by the contact of the pin with the ends of the slot which, in the preferred construction, is slightly longer than the slots 87.

With these several parts arranged and constructed as hitherto described, it will be apparent that while the implement is being pulled forward with the frame in normal position, the links 28 through the draft of the tractor will assume the position shown in Fig. 4, causing the slide 31 to move forward with respect to the pin 91 and the draft members 9, 9, the cross bar 88 and links 86 being correspondingly moved forward to swing the lifting arms 80 to the position shown in Fig. 3, in which they are normally maintained, irrespective of whether the frame is in lowered or raised position, so long as the implement is moving forward or is standing still. The moment, however, that the tractor is reversed, the links 28 through the rearward movement of the yoke 33 are swung rearwardly until, as shown in Fig. 6, the front end of the slot 90 is brought into contact with the pin 91, this rearward movement of the slide causing a corresponding movement of the links 86 which is operative, through contact with the forward ends of the slots 87 with the bolts 85, to swing the lifting arms 80 rearwardly to a position in which their uppermost notches can cooperate with the lantern wheels. From this point, further reverse movement of the tractor is effective to cause rotation of the ground wheels 20 in the direction of the arrow in Fig. 6, and, as during such reverse movement, the lifting arms 80 are continually maintained in position to cooperate with the lantern wheels, the spindles thereof through coaction with the notches 81 lift the frame to a point at which the toggles can cross the center and lock thus operating to support the frame in raised position in the manner already described, the smooth faces 82 of the lifting arms thereafter resting against or adjacent the spindles of the rotating lantern wheels so long as the rearward movement of the tractor and implement is continued. As soon, however, as the tractor is again moved forward, the links 28 are swung in a similar direction to the position shown in Fig. 5 and the lifting arms 80, through the action of the slide and cooperating parts, are moved to the position shown in that figure, the frame remaining supported in raised position by the toggles until the latter are broken by suitable operation of the toggle control shaft 56 and the frame again permitted to descend by gravity to normal or operative position.

Obviously to permit the toggles to operate to support the frame, it is necessary that the frame be raised sufficiently for the toggle members to cross the center, but frequently during operation it becomes desirable to back the implement for so short a distance that the toggle members do not become operative as the frame has been only partially raised. Under such conditions it will be evident that as soon as the implement is again moved forward, the lifting arms 80 will be pulled away from the lantern wheels and the frame allowed to fall to normal position through a distance equal to that through which it has been raised during the reverse movement. Furthermore, it will be apparent that by reason of the construction and arrangement of the mechanism through which the raising of the frame is accomplished following a reverse motion of the tractor, that the lifting arms are brought to operative position prior or substantially simultaneously to the time when the ground wheels commence to rotate in such direction, so that the frame begins to move upwardly substantially at the same time that the implement commences to move rearwardly; thus the tools are raised clear of the ground before they have been moved back sufficiently to receive an undue strain or result in the collection of débris.

Moreover, as the ground wheels are freely rotatable on the axle and as each of them is cooperative with a lifting arm, a lifting action is normally exerted on each side of the frame entirely independently of the corresponding action on the other side, so that, while under normal conditions of operation and equal traction of both wheels substantially the same lifting force is exerted on each side of the frame, if for any reason the lifting mechanism on one side of the machine is incapable of exerting its normal quota of power, the mechanism on the other side is entirely capable of lifting the frame without assistance from the first mentioned mechanism.

While I have herein illustrated and described with considerable particularity a preferred embodiment of my invention, comprising manually controlled means for raising and lowering the frame during the forward motion of the implement and automatically actuated means for raising the frame during the rearward movement of the implement, said last mentioned means may be dispensed with if desired or other changes and modifications made in the design, construction and arrangement of the several parts, or the invention may be embodied in implements intended for operations other than the cultivation of the ground, without departing from the spirit and scope of the invention as defined in the appended claims.

Having thus described my invention, I claim and desire to protect by Letters Patent of the United States:

1. In an implement of the class described, the combination of a normally substantially horizontally disposed tool carrying frame, an axle disposed beneath the frame and having arms extending to and movably connected with the frame, a pair of ground wheels freely rotatable on the axle, a lantern wheel secured to each wheel, a lifting arm horizontally pivoted above the frame in alignment with each lantern wheel and having a plurality of notches adapted to cooperate therewith, means for moving said arms from a position out of engagement with said wheels to a position in engagement therewith, and toggle members extending between the axle and the frame operative to maintain said frame in raised position after it has been lifted from normal position by coaction of said lifting arms and said lantern wheels.

2. In an implement of the class described, the combination of a normally substantially horizontally disposed tool carrying frame, an axle disposed beneath the frame and having arms movably connected therewith, a stop member carried by the frame and operative to determine the normal position of the frame with respect to said axle, a pair of ground wheels rotatable on the axle each provided with a lantern wheel rotatable therewith, a curved lifting arm pivoted in the vertical plane of each lantern wheel on a pivot fixed with respect to the frame and having a plurality of notches on its convex edge adapted to cooperate with the adjacent lantern wheel, manually operable means for simultaneously moving said lifting arms in a position to cooperate with the lantern wheels to thereby lift the frame on the rotation of the ground wheels, toggle members extending between the axle and the frame for maintaining said frame in elevated position after it has been raised for a given distance by the coaction of said arms and said lantern wheels, and means for returning said arms to a position out of engagement with the lantern wheels after said toggle members become operative to support the frame.

3. In an implement of the class described, the combination of a tool carrying frame, an axle disposed beneath and movably connected with the frame, ground wheels rotatable on the axle, a lifting arm pivoted on a support fixed with respect to the frame and having its major portion extending in rear of said axle and provided with a plurality of notches, a lifting arm pivoted on said support and having its major portion extending in front of said axle and provided with a plurality of notches, means carried by one of the ground wheels cooperative with the notches in either of the arms to lift the frame, manually operable means for moving said first mentioned lifting arm into cooperative relation with said means, and automatically actuated means for moving said last mentioned lifting arm into cooperative relation therewith.

4. In an implement of the class described, the combination of a tool carrying frame, an axle disposed beneath and movably connected with the frame, ground wheels rotatable on the axle, a lifting arm pivoted on a support fixed with respect to the frame and having its major portion extending in rear of said axle and provided with a plurality of notches, a lifting arm pivoted on said support and having its major portion extending in front of said axle and provided with a plurality of notches, a lantern wheel carried by one of the ground wheels, disposed in the vertical planes of said arms and adapted to cooperate with the notches therein, manually controlled means for moving the first mentioned arm from a position out of engagement with the lantern wheel to a position in engagement therewith to raise the frame with respect to the axle on a forward motion of the ground wheel, and automatically actuated means for moving the second mentioned lifting arm from a position out of engagement with the lantern wheel into a position in engagement therewith to raise the frame upon a rearward movement of the ground wheel.

5. In an implement of the class described, the combination of a tool carrying frame, an axle disposed beneath and movably connected with the frame, ground wheels rotatable on the axle, a lifting arm pivoted on a support fixed with respect to the frame and having its major portion extending in rear of said axle and provided with a plurality of notches, a lifting arm pivoted on said support and having its major portion extending in front of said axle and provided with a plurality of notches, a lantern wheel carried by one of the ground wheels, disposed in the vertical planes of said arms and adapted to cooperate with the notches therein, manually controlled means for moving the first mentioned arm from a position out of engagement with the lantern wheel to a position in engagement therewith to raise the frame with respect to the axle on a forward motion of the ground wheel, automatically actuated means for moving the second mentioned lifting arm from a position out of engagement with the lantern wheel into a position in engagement therewith to raise the frame upon a rearward movement of the ground wheel, and means extending between the axle and the frame adapted to lock and support the frame in raised position after it has been elevated by the coaction of either lifting arm with the lantern wheel.

6. In an implement of the class described, the combination of a tool carrying frame having draft means extending forwardly therefrom, an axle disposed beneath the frame and having arms movably connected therewith, ground wheels rotatable on the axle, a pair of lifting arms disposed adjacent each ground wheel, pivoted on a support fixed with respect to the frame and extending on opposite sides of the axle, power transmitting means carried by the ground wheel cooperative with either lifting arm to elevate the frame on the rotation of the ground wheel, manually controlled means for moving one of the lifting arms into engagement with said power transmitting means, means disposed adjacent the forward end of the draft means and adapted for connection to a tractor or the like, and means connecting said means and the other of said lifting arms operative to move said arm into engagement with said power transmitting means upon a backward movement of the tractor with respect to the implement.

7. In an agricultural implement, the combination of a tool carrying frame, an axle, ground wheels supported thereon, means cooperative with said wheels for lifting the frame with respect to the axle, draft means extending forward from the frame, a member supported by the draft means and adapted for connection to a tractor or the like, and means actuated from said member operative to move said lifting means from inoperative to operative position upon a rearward movement of said member with respect to the frame.

8. In an agricultural implement, the combination of a tool carrying frame, an axle connected therewith, ground wheels carried by the axle, power transmitting means carried by the ground wheels, lifting means supported from the frame and adapted to be thrown into and out of operative connection with said power transmitting means, draft means extending forwardly from the frame, a member supported from said draft means and adapted for connection to a tractor or the like, means extending between said member and said lifting means operative to throw said lifting means into engagement with said power transmitting means upon a rearward movement of the member with respect to the frame, and means for supporting the frame in elevated position after it has been raised with respect to the axle by coaction of said lifting means and said power transmitting means.

9. In an agricultural implement, the combination of a tool carrying frame, an axle connected therewith, ground wheels revoluble on the axle, power transmitting means carried by each ground wheel, a pair of lifting arms pivotally supported from the frame adjacent each wheel and arranged for cooperation with said power transmitting means, manually operable means for throwing one of said lifting arms into operative engagement with said power transmitting means to elevate the frame during rotation of the ground wheels in one direction, and automatically actuated means for throwing the other of said lifting arms into engagement with said power transmitting means to elevate the frame during rotation of said ground wheels in the opposite direction.

10. In an agricultural implement, the combination of a tool carrying frame, an axle beneath the frame and connected therewith, a ground wheel rotatable on the axle, power transmitting means carried by the ground wheel, a lifting arm pivotally supported from the frame and arranged for cooperation with said power transmitting means, means for throwing said lifting arm into engagement with said power transmitting means to raise the frame during rotation of the ground wheel in one direction, automatically actuated means for returning said arm to initial position when the frame has been raised to a predetermined height with respect to the axle by coaction of said arm and said power transmitting means, and means for supporting the frame in elevated position.

11. In an agricultural implement, the combination of a tool carrying frame having draft means extending forwardly therefrom, a member carried by the draft means and adapted for attachment to a tractor or the like, an axle beneath the frame and connected therewith, a ground wheel supported on the axle, power transmitting means carried by the ground wheel, a pair of lifting arms pivotally supported from the frame and arranged for cooperation with the power transmitting means, manually operable means for throwing one of said lifting arms into engagement with said power transmitting means to lift the frame with respect to the axle upon rotation of the ground wheel in one direction, automatically actuated means for returning said arm to initial position when said frame has been raised for a predetermined distance, and means extending between the other of said arms and said member and actuated by a rearward movement of said member to throw said arm into engagement with said power transmitting means to lift said frame upon the rotation of said ground wheel in the opposite direction and to move said arm to initial position on the movement of said member in the opposite direction.

12. In an agricultural implement, the combination of a tool carrying frame having draft means extending forwardly therefrom, a member carried by the draft means and adapted for attachment to a tractor or the like, an axle beneath the frame and connected therewith, a ground wheel supported on the axle, power transmitting means carried by the ground wheel, a pair of lifting arms pivotally supported from the frame and arranged for cooperation with the power transmitting means, manually operable means for throwing one of said lifting arms into engagement with said power transmitting means to lift the frame with respect to the axle upon rotation of the ground wheel in one direction, automatically actuated means for returning said arm to initial position when said frame has been raised for a predetermined distance, means extending between the other of said arms and said member and actuated by a rearward movement of said member to throw said arm into engagement with said power transmitting means to lift said frame upon the rotation of said ground wheel in the opposite direction and to move said arm to initial position on the movement of said member in the opposite direction, and means extending between the axle and the frame operative to support said frame in elevated position after it has been raised thereto by coaction of either of said lifting arms and said power transmitting means.

13. In an agricultural implement, the combination of a tool carrying frame, an axle beneath the frame and connected therewith, a ground wheel rotatable on the axle, power transmitting means carried by the ground wheel, a lifting arm pivotally supported from the frame and arranged for cooperation with said power transmitting means, means for throwing said lifting arm from a position out of engagement with said power transmitting means to a position in engagement therewith to lift the frame from lowered position upon rotation of the ground wheel, means for supporting the frame after it has been raised for a predetermined distance by coaction of said arm and said power transmitting means, means for automatically throwing said arm out of engagement with the power transmitting means after said supporting means become operative to support the frame, and manually operable means for releasing said supporting means to permit the frame to return to lowered position.

In witness whereof, I have hereunto set my hand this 13th day of September, 1922.

JOSEPH MADER.